(12) United States Patent
Imura

(10) Patent No.: US 7,949,881 B2
(45) Date of Patent: May 24, 2011

(54) MOBIL TERMINAL DEVICE, PERSONAL IDENTIFICATION NUMBER VERIFICATION PROGRAM, AND METHOD OF VERIFYING PERSONAL IDENTIFICATION NUMBER

(75) Inventor: Shigeru Imura, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 980 days.

(21) Appl. No.: 11/471,488

(22) Filed: Jun. 21, 2006

(65) Prior Publication Data

US 2007/0011466 A1    Jan. 11, 2007

(30) Foreign Application Priority Data

Jul. 5, 2005   (JP) ................................ 2005-196063

(51) Int. Cl.
*H04L 9/32* (2006.01)
*G06F 21/00* (2006.01)
*H04K 1/00* (2006.01)

(52) U.S. Cl. ................. 713/186; 380/44; 726/7; 726/19

(58) Field of Classification Search .......... 713/182–186; 380/270, 277
See application file for complete search history.

(56) References Cited

U.S. PATENT DOCUMENTS

| 5,680,460 | A  | * | 10/1997 | Tomko et al. ................. 713/186 |
| 7,111,173 | B1 | * | 9/2006  | Scheidt .......................... 713/186 |
| 2003/0005310 | A1 | * | 1/2003 | Shinzaki ....................... 713/186 |
| 2006/0174134 | A1 | * | 8/2006 | Taylor .......................... 713/186 |
| 2007/0168674 | A1 | * | 7/2007 | Nonaka et al. ................ 713/182 |
| 2007/0220273 | A1 | * | 9/2007 | Campisi ........................ 713/186 |
| 2007/0226511 | A1 | * | 9/2007 | Wei et al. ....................... 713/186 |
| 2008/0072063 | A1 | * | 3/2008 | Takahashi et al. ............ 713/186 |
| 2008/0212771 | A1 | * | 9/2008 | Hauser ............................ 380/44 |

FOREIGN PATENT DOCUMENTS

| DE | 101 00 188 A1 | 7/2002 |
| JP | 09-182154 A | 7/1997 |
| JP | 2000-358025 A | 12/2000 |
| JP | 2001-216309 A | 8/2001 |
| JP | 2002-512409 A | 4/2002 |
| JP | 2003-323440 A | 11/2003 |
| JP | 2003-346098 | 12/2003 |
| JP | 2004-088607 A | 3/2004 |
| WO | WO-97/05578 A1 | 2/1997 |
| WO | WO-99/54851 A1 | 10/1999 |

OTHER PUBLICATIONS

Extended European Search Report issued Aug. 4, 2009 for corresponding European Application No. 06 11 6677.

\* cited by examiner

*Primary Examiner* — Christopher A Revak
(74) *Attorney, Agent, or Firm* — Rader, Fishman & Grauer PLLC

(57) ABSTRACT

A mobile terminal device includes biometric information detecting means for detecting biometric information; encryption key generating means for generating an encryption key on the basis of the biometric information in registration; encrypting means for encrypting a predetermined personal identification number with the encryption key to generate a biometric encrypted personal identification number in the registration; encrypted personal-identification-number storing means for storing the biometric encrypted personal identification number in the registration; decryption key generating means for generating a decryption key on the basis of the detected biometric information in verification; decrypting means for decrypting the biometric encrypted personal identification number with the decryption key to reproduce the personal identification number in the verification; and personal identification number verifying means for comparing the reproduced personal identification number with the stored biometric encrypted personal identification number to perform the personal-identification-number verification.

8 Claims, 3 Drawing Sheets

MOBIL TERMINAL DEVICE, PERSONAL IDENTIFICATION NUMBER VERIFICATION PROGRAM, AND METHOD OF VERIFYING PERSONAL IDENTIFICATION NUMBER

CROSS REFERENCES TO RELATED APPLICATIONS

The present invention contains subject matter related to Japanese Patent Application JP 2005-196063 filed in the Japanese Patent Office on Jul. 5, 2005, the entire contents of which are incorporated herein by reference.

BACKGROUND OF THE INVENTION

1. Field of the Invention

The present invention relates to a mobile terminal device, a personal identification number (hereinafter referred to as a PIN) verification program, and a method of verifying a PIN, which are preferably applicable to, for example, a mobile telephone, a personal handyphone system (PHS), a personal digital assistant (PDA) with a wireless communication function, or a laptop personal computer, having a PIN verification function and a biometric information detecting function.

2. Description of the Related Art

Mobile telephones, including ones adopting a global system for mobile communications (GSM) are known nowadays, which perform user authentication with subscriber identity module (SIM) cards detachable from the telephones. Specifically, each SIM card has information concerning a subscriber and a PIN stored therein. A user operates an operational unit of the mobile telephone to input his own PIN. The PIN input by the user is compared with the PIN stored in the SIM card. Use of the mobile telephone is permitted only if the PIN input by the user coincides with the one stored in the SIM card.

Meanwhile, user authentication using biometric information including the fingerprints, irises, or vein patterns of users has come into practical use in recent years. For example, an electronic device and an authentication method using such user authentication are disclosed in Japanese Unexamined Patent Application Publication No. 2002-512409.

SUMMARY OF THE INVENTION

Mobile telephones adopting PIN verification are in widespread use these days and, at the same time, there is a move to adopt biometric authentication in the mobile telephones. Only adding the biometric authentication to the mobile telephones adopting the PIN verification undesirably forces users to keep the PIN verification and the biometric authentication separate or to use both the PIN verification and the biometric authentication.

It is desirable to provide a mobile terminal device, a PIN verification program, and a method of verifying a PIN, which ensure compatibility between the widespread PIN verification and the biometric authentication growing popular so as to provide a new, simple, and inexpensive authentication method ensuring higher security and having greater convenience.

According to an embodiment of the present invention, there is provided a mobile terminal device including: biometric information detecting means for detecting biometric information; encryption key generating means for generating an encryption key on the basis of the biometric information detected by the biometric information detecting means, in personal-identification-number registration; encrypting means for encrypting a predetermined personal identification number with the encryption key generated by the encryption key generating means to generate a biometric encrypted personal identification number, in the personal-identification-number registration; encrypted personal-identification-number storing means for storing the biometric encrypted personal identification number generated by the encrypting means, in the personal-identification-number registration; decryption key generating means for generating a decryption key on the basis of the biometric information detected by the biometric information detecting means, in personal-identification-number verification; decrypting means for decrypting the biometric encrypted personal identification number stored in the encrypted personal-identification-number storing means with the decryption key generated by the decryption key generating means to reproduce the personal identification number, in the personal-identification-number verification; and personal identification number verifying means for comparing the personal identification number reproduced by the decrypting means with the biometric encrypted personal identification number stored in advance in the encrypted personal-identification-number storing means to perform the personal-identification-number verification for enabling a predetermined function.

According to another embodiment of the present invention, there is provided a personal-identification-number verification program causing a computer to function as: encryption-key generating and controlling means for controlling encryption key generating means so as to generate an encryption key on the basis of biometric information detected by biometric information detecting means, in personal-identification-number registration; encryption controlling means for encrypting a predetermined personal identification number with the encryption key generated by the encryption-key generating means by causing the computer to function as the encryption-key generating and controlling means to generate a biometric encrypted personal identification number and controlling encrypting means so as to store the biometric encrypted personal identification number in encrypted personal-identification-number storing means, in the personal-identification-number registration; decryption-key generating and controlling means for controlling decryption key generating means so as to generate a decryption-key on the basis of the biometric information detected by the biometric information detecting means, in personal-identification-number verification; decryption controlling means for controlling decrypting means so as to decrypt the biometric encrypted personal identification number stored in the encrypted personal-identification-number storing means with the decryption key generated by the decryption key generating means by causing the computer to function as the decryption-key generating and controlling means to reproduce the personal identification number, in the personal-identification-number verification; and personal-identification-number verifying and controlling means for comparing the personal identification number reproduced by causing the computer to function as the decryption controlling means with the personal identification number stored in advance in the encrypted personal-identification-number storing means to control the personal identification number verifying means so as to perform the personal-identification-number verification for enabling a predetermined function, in the personal-identification-number verification.

According to yet another embodiment of the present invention, there is provided a method of verifying a personal identification number including the steps of: generating, by encryption-key generating means, an encryption key on the basis of biometric information detected by biometric information detecting means, in personal-identification-number registration; encrypting, by encrypting means, a predetermined personal identification number with the generated encryption key to generate a biometric encrypted personal identification number and storing the biometric encrypted personal identification number in encrypted personal-identification-number storing means, in the personal-identification-number registration; generating, by decryption-key generating means, a decryption key on the basis of the biometric information detected by the biometric information detecting means, in personal-identification-number verification; decrypting, by decrypting means, the biometric encrypted personal identification number stored in the encrypted personal-identification-number storing means with the generated decryption key to reproduce the personal identification number, in the personal-identification-number verification; and comparing, by personal-identification-number verifying means, the personal identification number reproduced by the decrypting means with the personal identification number stored in the encrypted personal-identification-number storing means in the personal-identification-number registration to perform the personal-identification-number verification for enabling a predetermined function, in the personal-identification-number verification.

According to the embodiments of the present invention, in the registration of the personal identification number, the encryption key is generated on the basis of the biometric information detected by the biometric information detecting means, a predetermined personal identification number is encrypted with the encryption key to generate the biometric encrypted personal identification number, and the biometric encrypted personal identification number is stored in the encrypted personal-identification-number storing means.

In the verification of the personal identification number, the biometric encrypted personal identification number stored in the encrypted personal-identification-number storing means is decrypted with the decryption key generated on the basis of the biometric information detected by the biometric information detecting means to reproduce the personal identification number and the reproduced personal identification number is supplied to the personal identification number verifying means. The personal identification number verifying means compares the personal identification number that is decrypted and reproduced with the personal identification number stored in advance in the encrypted personal-identification-number storing means to perform the personal-identification-number verification for enabling a predetermined function.

According to the present invention, it is possible to realize an inexpensive mobile terminal device adopting the new and simple authentication method ensuring higher security and having greater convenience.

According to the present invention, it is also possible to realize a new, simple and inexpensive authentication system ensuring higher security and having greater convenience.

DESCRIPTION OF THE PREFERRED EMBODIMENTS

The present invention is applicable to a mobile telephone that compares a PIN stored in a SIM card with a PIN input by an user and, if the PIN stored in the SIM card coincides with the PIN input by the user, enables predetermined functions to perform PIN verification.

Structure of Mobile Telephone and General Operation Thereof

Figure 1:
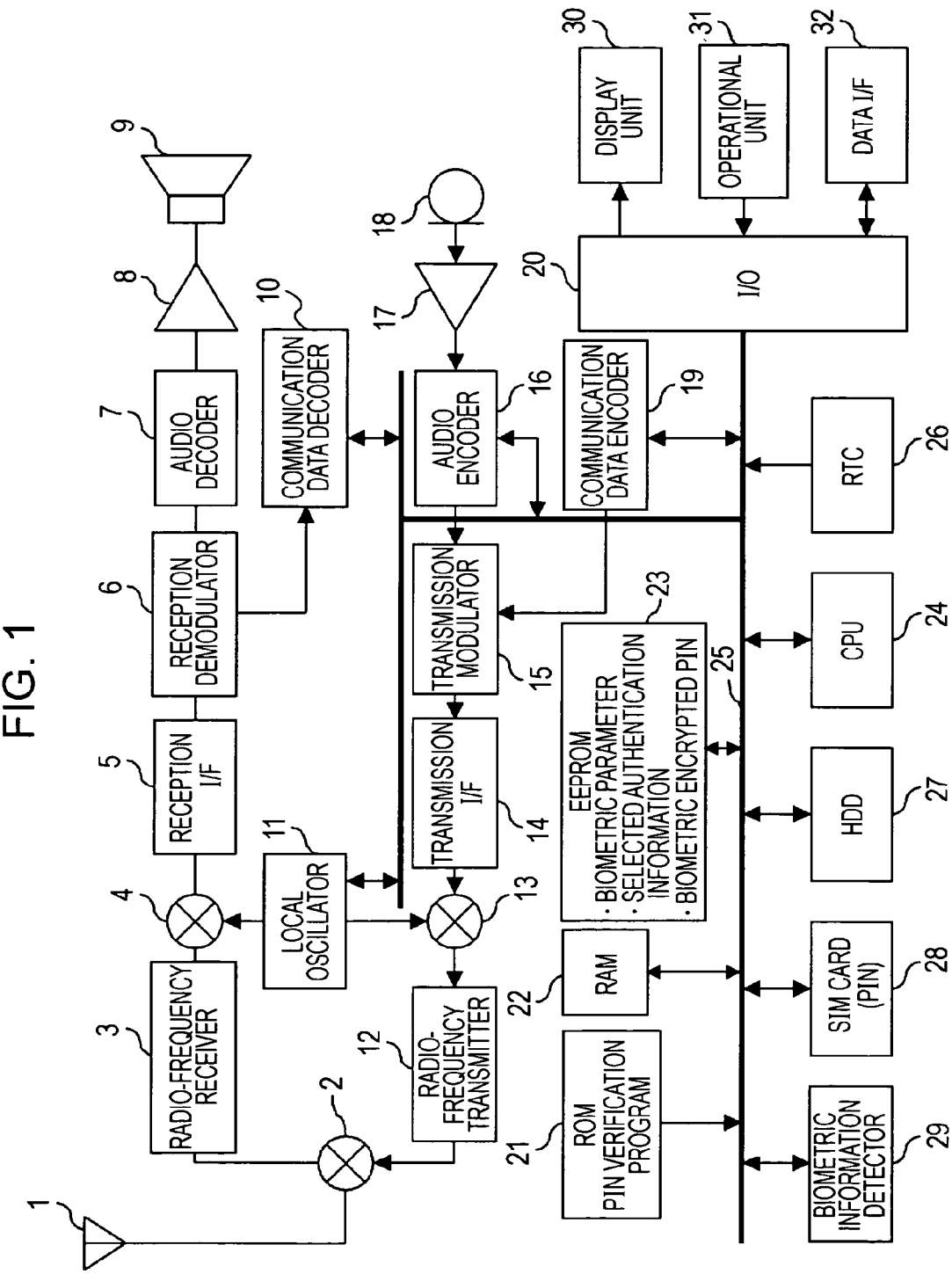
FIG. 1 is a block diagram showing an example of the structure of a mobile telephone according to an embodiment of the present invention.

FIG. 1 is a block diagram showing an example of the structure of a mobile telephone according to an embodiment of the present invention. In signal reception, a reception signal, which an antenna 1 has received from a base station, is supplied to a radio-frequency receiver 3 through a selector 2. The radio-frequency receiver 3 amplifies the reception signal to a level necessary for frequency conversion and supplies the amplified reception signal to a mixer 4. The mixer 4 converts the reception signal into an intermediate-frequency signal on the basis of an intermediate-frequency conversion signal supplied from a local oscillator 11 and supplies the converted reception signal to a reception interface 5.

The reception interface 5 performs analog-to-digital (A/D) conversion to the intermediate-frequency reception signal to digitize the reception signal and supplies the digital signal to a reception demodulator 6 as a sample signal having a predetermined bit rate. The reception demodulator 6 performs, for example, error correction to the sample signal to divide the sample signal into audio data and communication data. The reception demodulator 6 supplies the audio data to an audio decoder 7 and the communication data to a communication data decoder 10.

The audio decoder 7 performs decompression, etc. to the audio data to change the bit rate of the audio data and performs digital-to-analog (D/A) conversion to the audio data. The audio decoder 7 then supplies the analog audio signal to a speaker 9 through a speaker amplifier 8. The speaker 9 outputs a sound power corresponding to the reception signal received by the antenna 1.

The communication data decoder 10 performs a predetermined demodulation process to the supplied communication data to demodulate the communication data. The demodulated communication data is stored in and controlled by, for example, a random access memory (RAM) 22 or is displayed in a display unit 30.

In contrast, in signal transmission, a sound collected by a microphone 18 is amplified by a microphone amplifier 17 with a predetermined gain and the amplified audio signal is supplied to an audio encoder 16. The audio encoder 16 performs the A/D conversion to the audio signal and performs compression to the audio signal to change the bit rate of the audio signal. The audio encoder 16 then supplies the audio data to a transmission modulator 15. The audio data can also be supplied to a central processing unit (CPU) 24 through a CPU bus line 25.

The communication data, excluding the audio data, is subjected to compression in a communication data encoder 19 and is supplied to a transmission modulator 15 with an error correction code being added.

The transmission modulator 15 performs a predetermined modulation and encoding process and the D/A conversion to the audio data or the communication data and supplies the modulated analog data to a transmission interface 14. The transmission interface 14 converts the analog audio or communication signal into an intermediate-frequency audio or communication signal, amplifies the audio or communication signal to a required level, and supplies the amplified audio or communication signal to a mixer 13.

The mixer 13 converts the audio or communication signal into a transmission-frequency audio or communication signal on the basis of a transmission-frequency conversion signal supplied from the local oscillator 11, and supplies the converted audio or communication signal to a radio-frequency transmitter 12. The radio-frequency transmitter 12 amplifies the transmission-frequency audio or communication signal with a predetermined gain and supplies the amplified audio or communication signal to the antenna 1 through the selector 2. The audio or communication signal is transmitted to the base station through the antenna 1.

In the mobile telephone having the above structure, the display unit 30, an operational unit 31, and a data interface (data I/F) 32 are connected to the CPU 24 via an input-output unit (I/O) 20 and the CPU bus line 25.

A read only memory (ROM) 21, the RAM 22, and an electrically-erasable and programmable read only memory (EEPROM) 23 are connected to the CPU 24 via the CPU bus line 25. In addition, a timer (real time clock (RTC)) 26, a high-capacity hard disk drive (HDD) 27, a SIM card 28 detachable from the mobile telephone, and a biometric information detector 29 are also connected to the CPU 24 via the CPU bus line 25.

The timer 26 measures the current time and supplies the timing information to the CPU 24. The non-volatile ROM 21 has a PIN verification program, in addition to a communication program, etc., stored therein. The CPU 24 executes and controls user authentication, described below, on the basis of the PIN verification program stored in the ROM 21. The readable and writable RAM 22 has data temporarily generated during data processing by the CPU 24.

The EEPROM 23 has setting conditions, etc. of the mobile telephone stored therein. The setting conditions, etc. are set by an user who operates the operational unit 31. The EEPROM 23 also has biometric parameters used for the user authentication, selected authentication information, and a biometric encrypted PIN stored therein. The selected authentication information, which is selected and set in advance by the user, indicates whether the PIN verification is used in the authentication and indicates whether biometric authentication is combined with the PIN verification if the PIN verification is used. The biometric encrypted. PIN is encrypted with an encryption key generated on the basis of the biometric parameters of the user in registration of the PIN.

The biometric information detector 29 detects biometric information including the fingerprint, iris, or vein pattern of the user and outputs the detected biometric information. The biometric parameters stored in the EEPROM 23 are generated on the basis of the biometric information detected by the biometric information detector 29.

The SIM card 28 has the contractual coverage presented to the user (subscriber) by a communication organization, which is the issuer of the SIM card 28, information necessary for the communication, a telephone directory, and so on stored thereon. The SIM card 28 has its own CPU and a PIN memory having the PIN. The CPU of the SIM card 28 communicates with the CPU 24 of the mobile telephone according to the embodiment of the present invention to compare the PIN input by the user with the PIN stored in the PIN memory. If the PIN input by the user coincides with the PIN stored in the PIN memory (the user authentication authenticates the user as the authorized user), the SIM card 28 permits access to a variety of information stored in the SIM card 28. The access permission allows the telephone function and the like of the mobile telephone according to the embodiment of the present invention to be used.

Authentication Modes

The mobile telephone according to the embodiment of the present invention determines in advance whether user authentication with the PIN is performed and sets the determination. If the mobile telephone determines and sets the user authentication with the PIN, the mobile telephone determines whether the user authentication is performed only with the PIN or whether the user authentication with the PIN is combined with the user authentication with the biometric information and sets the determination.

The information that is determined and set here is stored in the EEPROM 23 as the "selected authentication information". The CPU 24 confirms the selected authentication information stored in the EEPROM 23 in the user authentication. If the selected authentication information indicates that the user authentication with the PIN is not performed, the CPU 24 accesses the SIM card 28 without performing the user authentication.

In contrast, if the selected authentication information stored in the EEPROM 23 indicates that the user authentication only with the PIN is performed, the CPU 24 moves to a "manual authentication mode" in the user authentication and displays a screen in which the PIN is input in the display unit 30. After the user inputs the PIN with the operational unit 31, the CPU 24 supplies the input PIN to the SIM card 28.

The CPU of the SIM card 28 compares the PIN input by the user with the PIN stored in the PIN memory. If the PIN input by the user coincides with the PIN stored in the PIN memory, the CPU of the SIM card 28 authenticates the user who has input the PIN as the authorized user and supplies access enabling information indicating permission of an access to the SIM card 28 to the CPU 24 of the mobile telephone. The CPU 24 of the mobile telephone accesses the SIM card 28 in response to the access enabling information. The above process allows the use of various functions of the mobile telephone on the basis of information concerning the subscriber, stored in the SIM card 28.

In contrast, if the selected authentication information stored in the EEPROM 23 indicates that the user authentication with the PIN is combined with the user authentication with the biometric information, the CPU 24 moves to an "automatic authentication mode" in the user authentication to perform new user authentication in which the user authentication with the PIN is combined with the user authentication with the biometric information, on the basis of the PIN verification program stored in the ROM 21.

In order to enable new user authentication, it is necessary to register in advance the biometric parameters of the user and to register the PIN that coincides with the PIN stored in the SIM card 28.

Registration of Biometric Parameters

When the user selects the user authentication in which the user authentication with the PIN is combined with the user authentication with the biometric information, the CPU 24 displays a message prompting the user to input the biometric information in the display unit 30, on the basis of the PIN verification program stored in the ROM 21.

If the biometric information detector 29 is a fingerprint sensor, the user holds a finger over the fingerprint sensor to provide the fingerprint information when the message prompting the user to input the biometric information is displayed in the display unit 30. Alternatively, if the biometric information detector 29 is an iris sensor, the user shoots his iris with a camera to provide the iris information.

After the biometric information is detected in the biometric information detector 29 in the above manner, the CPU 24 generates the biometric parameters of the user on the basis of the biometric information and registers the generated biometric parameters in the EEPROM 23. The registration of the biometric parameters is completed.

Registration of PIN (Biometric Encrypted PIN)

Figure 2:
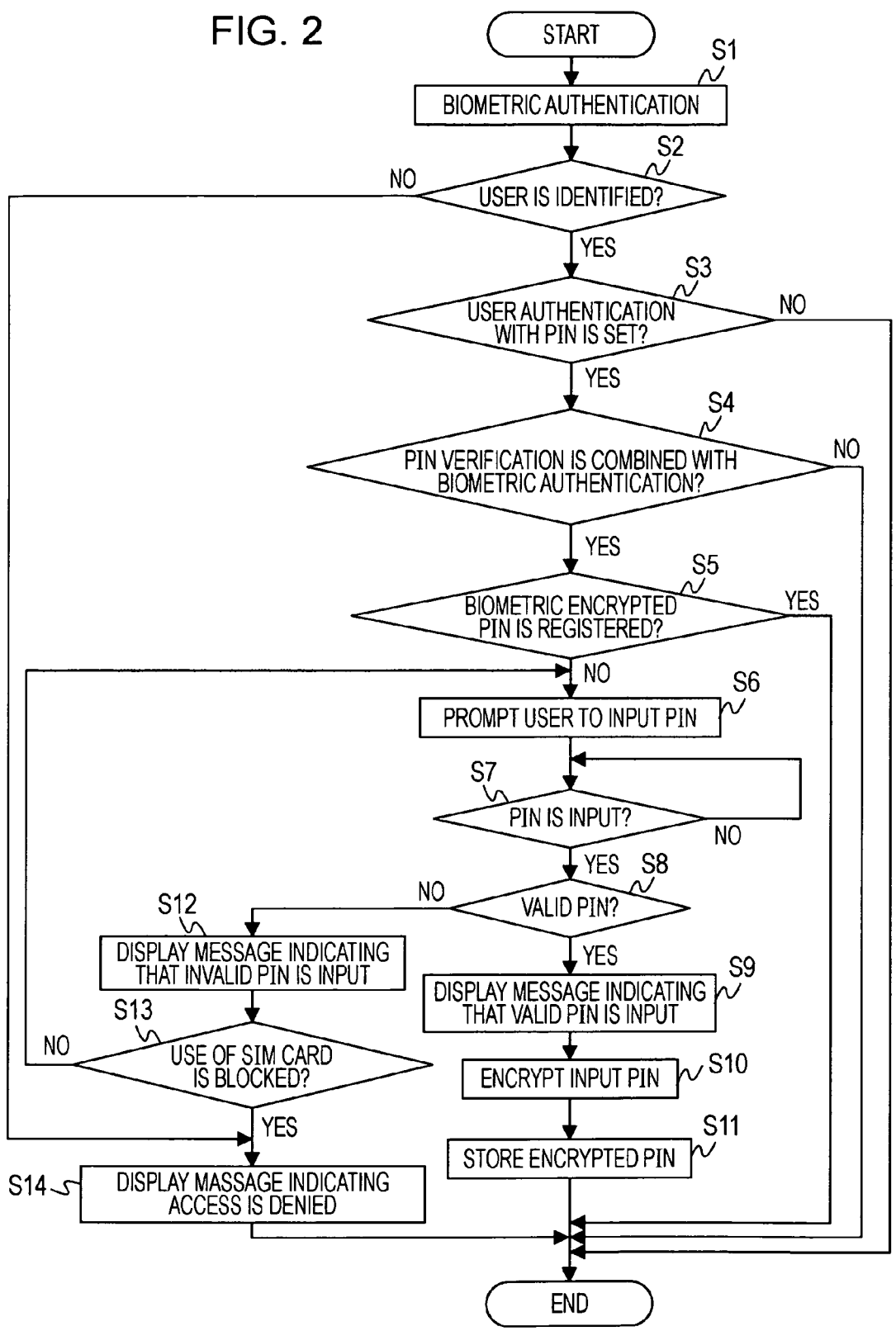
FIG. 2 is a flowchart showing a process of registering a PIN encrypted with biometric information in the mobile telephone according to the embodiment of the present invention.

After the biometric parameters are registered in the above-manner, the CPU 24 registers the PIN coinciding with the PIN that is input by the user and the pin is stored in the SIM card 28 in the mobile telephone on the basis of the PIN verification program stored in the ROM 21. FIG. 2 is a flowchart showing a process of registering the PIN.

After the biometric parameters are registered, in Step S1, the CPU 24 of the mobile telephone displays a message prompting the user to input the biometric information in the display unit 30. The user provides the biometric information through the biometric information detector 29 in response to the message in the manner described above.

After the biometric information about the user is detected, in Step S2, the CPU 24 generates a biometric parameter on the basis of the biometric information provided by the user. The CPU 24 compares the generated biometric parameter with the biometric parameter registered in advance in the EEPROM 23 in the registration of the biometric parameter to determine whether the generated biometric parameter coincides with the biometric parameter registered in advance in the EEPROM 23.

If the generated biometric parameter does not coincide with the biometric parameter registered in advance in the EEPROM 23, the CPU 24 determines that the user who provides the biometric information is not authorized as the user of the mobile telephone and the process proceeds to Step S14. In Step S14, the CPU 24 displays a message to deny use of the mobile telephone by the user who provides the biometric information in the display unit 30 and terminates the process in FIG. 2.

If the CPU 24 determines in Step S2 that the generated biometric parameter coincides with the biometric parameter registered in advance in the EEPROM 23, the CPU 24 determines that the user who provides the biometric information is authorized as the user of the mobile telephone and the process proceeds to Step S3. In Step S3, the CPU 24 determines whether the user authentication with the PIN is set on the basis of the selected authentication information stored in the EEPROM 23.

When the user authentication with the PIN is not set, the user authentication is performed only on the basis of the biometric information. Hence, if the CPU 24 determines in Step S3 that the user authentication with the PIN is not set, the CPU 24 terminates the process in FIG. 2.

If the CPU 24 determines in Step S3 that the user authentication with the PIN is set, the process proceeds to Step S4. In Step S4, the CPU 24 determines whether the user authentication with the PIN is set so as to be combined with the user authentication with the biometric information on the basis of the selected authentication information stored in the EEPROM 23. If the CPU 24 determines that the user authentication with the PIN is not set so as to be combined with the user authentication with the biometric information, the CPU 24 terminates the process in FIG. 2. If the CPU 24 determines that the user authentication with the PIN is set so as to be combined with the user authentication with the biometric information, the process proceeds to Step S5.

As described below, in the mobile telephone according to the embodiment of the present invention, after the user inputs the PIN coinciding with the PIN stored in the SIM card 28, the PIN input by the user is encrypted with the biometric parameter to generate the biometric encrypted PIN that is stored in the EEPROM 23. Accordingly, in Step S5, the CPU 24 determines whether the biometric encrypted PIN has been already registered in the EEPROM 23. If the biometric encrypted PIN has already been registered in the EEPROM 23, the CPU 24 terminates the process in FIG. 2.

If the biometric encrypted PIN has not been registered in the EEPROM 23, the process proceeds to Step S6. In Step S6, the CPU 24 displays a message prompting the user to input the PIN coinciding with the PIN stored in the SIM card 28 in the display unit 30 and the process proceeds to Step S7.

The user inputs the PIN coinciding with the PIN stored in the SIM card 28 with the operational unit 31 in response to the message. In Step S7, the CPU 24 monitors input of the PIN by the user to determine whether the PIN is input by the user. If the CPU 24 determines that the PIN is input by the user, the process proceeds to Step S8.

The CPU 24 transfers the PIN input by the user to the SIM card 28. The CPU of the SIM card 28 compares the transferred PIN (the PIN input by the user) with the PIN (authorized PIN) stored in the PIN memory of the SIM card 28. The CPU of the SIM card 28 transmits the result of this comparison to the CPU 24 of the mobile telephone. In Step S8, the CPU 24 of the mobile telephone receives the result from the SIM card 28 to determine whether the PIN input by the user coincides with the authorized PIN stored in the PIN memory. If the CPU 24 determines that the PIN input by the user does not coincide with the authorized PIN stored in the PIN memory, the process proceeds to Step S12. If the CPU 24 determines that the PIN input by the user coincides with the authorized PIN stored in the PIN memory, the process proceeds to Step S9.

In Step S12, the CPU 24 displays a message indicating that an unauthorized PIN is input in the display unit 30 and the process proceeds to Step S13.

In the mobile telephone according to the embodiment of the present invention, if at least one unauthorized PIN is input a predetermined number of times, for example, three times, the CPU 24 inhibits subsequent accesses to the SIM card 28 to block use of the functions of the mobile telephone. In this case, after displaying the message indicating that an unauthorized PIN is input in the display-unit 30 in Step S12, then in Step S13, the CPU 24 determines whether at least one unauthorized PIN is input the predetermined number of times or more (three times or more in this example) and access to the SIM card 28 is inhibited. If access to the SIM card 28 is not inhibited, the CPU 24 goes back to Step S6. If access to the SIM card 28 is inhibited, that is, if the user inputs at least one unauthorized PIN the predetermined number of times or more, the process proceeds to Step S14. In Step S14, the CPU 24 displays the message to deny use of the functions of the mobile telephone by the user in the display unit 30 and terminates the process in FIG. 2.

If the CPU 24 determines in Step S8 that the PIN input by the user coincides with the authorized PIN stored in the PIN memory, then in Step S9, the CPU 24 displays a message indicating that the user authentication with the PIN is normally terminated in the display unit 30 and the process proceeds to Step S10.

Since the PIN input by the user coincides with the PIN stored in the SIM card 28, then in Step S10, the CPU 24 encrypts the PIN input by the user with the biometric parameter stored in the EEPROM 23 to generate the "biometric encrypted PIN".

Specifically, in the encryption of the PIN, the biometric parameter stored in the EEPROM 23 is used as the encryption key to encrypt the PIN input by the user.

After the PIN is encrypted, then in Step S11, the CPU 24 stores the "biometric encrypted PIN" in the EEPROM 23 and terminates the process in FIG. 2. The registration of the PIN is completed.

User Authentication with Biometric Authentication Being Combined with PIN Verification After the biometric encrypted PIN is registered in the EEPROM 23 in the above manner, it is possible to realize the new user authentication in which the user authentication with the biometric information is combined with the user authentication with the PIN.

Specifically, after an operation of any key on the mobile telephone is detected, the CPU 24 determines whether the user authentication in which the user authentication with the biometric information is combined with the user authentication with the PIN is set, on the basis of the selected authentication information stored in the EEPROM 23. If the user authentication in which the user authentication with the biometric information is combined with the user authentication with the PIN is set, the CPU 24 displays a message prompting the user to input the biometric information in the display unit 30 on the basis of the PIN verification program stored in the ROM 21. The user provides his own biometric information through the biometric information detector 29 in response to the message.

Figure 3:
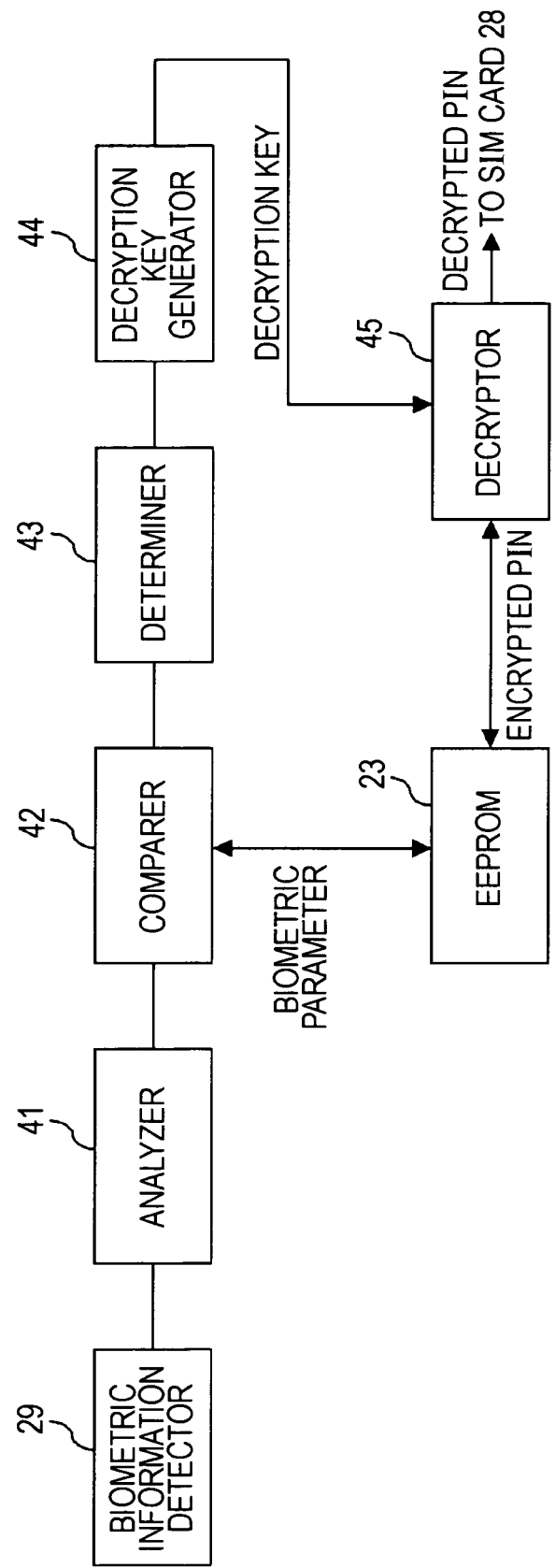
FIG. 3 is a functional block diagram of the CPU of the mobile telephone according to the embodiment of the present invention, showing how to decrypt the PIN encrypted with the biometric information.

FIG. 3 is a functional block diagram of the CPU 24, showing how to decrypt the biometric encrypted PIN stored in the EEPROM 23 on the basis of the biometric information provided by the user to transfer the decrypted biometric encrypted PIN to the SIM card 28. Components from an analyzer 41 to a decryptor 45, excluding the EEPROM 23 and the biometric information detector 29, form the functional block diagram of the CPU 24 operating on the basis of the PIN verification program.

Referring to FIG. 3, after the biometric information about the user is detected in the biometric information detector 29, the CPU 24 functions as the analyzer 41 to analyze the biometric information detected in the biometric information detector 29 and generate the biometric parameter.

Next, the CPU 24 functions as a comparer 42 to compare the biometric parameter generated by the CPU 24 functioning as the analyzer 41 with the biometric parameter stored in the EEPROM 23 in the registration of the biometric parameter.

Next, the CPU 24 functions as a determiner 43 to determine whether the biometric parameter corresponding to the biometric information provided by the user coincides with the biometric parameter stored in advance in the EEPROM 23 on the basis of the comparison result achieved when the CPU 24 functions as the comparer 42.

If the CPU 24 determines that the biometric parameter corresponding to the biometric information provided by the user does not coincide with the biometric parameter stored in advance in the EEPROM 23, the CPU 24 displays a message indicating that the functions of the mobile telephone are disabled in the display unit 30. If the CPU 24 determines that the biometric parameter corresponding to the biometric information provided by the user coincides with the biometric parameter stored in advance in the EEPROM 23, the CPU 24 functions as a decryption key generator 44 to set the biometric parameter corresponding to the biometric information about the user as a decryption key.

Next, the CPU 24 functions as the decryptor 45 to decrypt and reproduce the encrypted PIN by decrypting the biometric encrypted PIN stored in the EEPROM 23 by using the biometric parameter set by the CPU 24 functioning as the decryption key generator 44, as the decryption key and supplies the decrypted and reproduced PIN to the SIM card 28.

Deletion of Decryption Key

After the decryption process is terminated, the CPU 24 deletes the decryption key used in the decryption process. In other words, the mobile telephone generates a decryption key each time the user authentication is performed. Accordingly, since the decryption key is not left in the mobile telephone, it is possible to improve the security in the user authentication.

The CPU of the SIM card 28 compares the PIN that is decrypted and reproduced on the basis of the biometric information provided by the user with the PIN stored in the PIN memory of the SIM card 28. If the decrypted and reproduced PIN coincides with the PIN stored in the PIN memory of the SIM card 28, the CPU of the SIM card 28 authenticates the user who inputs the PIN as the authorized user of the mobile telephone and supplies the access-enabling information indicating permission of an access to the SIM card 28 to the CPU 24 of the mobile telephone. The CPU 24 of the mobile telephone accesses the variety of information stored in the SIM card 28 in response to the access enabling information that is received. As a result, it is possible to use the various functions of the mobile telephone on the basis of the information concerning the subscriber stored in the SIM card 28.

In the above example, the biometric parameter is used as the encryption key to encrypt the PIN input by the user and the biometric parameter generated on the basis of the biometric information provided by the user is used as the decryption key to decrypt the encrypted PIN. However, a predetermined encryption key may be generated on the basis of the biometric parameter, the generated encryption key may be used to encrypt the PIN input by the user, the decryption key corresponding to the encryption key may be generated on the basis of the biometric parameter corresponding to the biometric information provided by the user, and the generated decryption key may be used to decrypt the encrypted PIN.

Although the CPU 24 generates the decryption key if the CPU 24 determines that the biometric parameter corresponding to the biometric information provided by the user coincides with the biometric parameter stored in advance in the EEPROM 23, the CPU 24 may generate the decryption key on the basis of the biometric parameter analyzed by the CPU 24 functioning as the analyzer 41 and, if the CPU 24 determines that the both of the biometric parameters coincide with each other, the CPU 24 may use the decryption key generated by the CPU 24 functioning as the analyzer 41 to decrypt the biometric encrypted PIN.

As described above, the mobile telephone according to the embodiment of the present invention has the following features.

Improved Security

It is sufficient to input the PIN only at the beginning (only in the registration), and the user authentication with the biometric information is performed after the PIN is registered. Accordingly, it is possible to prevent a third person from stealing a glance at the PIN that is being input, thereby improving the security of the mobile telephone.

Since the encrypted PIN is not decrypted unless the user is authenticated as the authorized user in the biometric authentication, it is possible to prevent unauthorized use of the mobile telephone by a malicious third person due to theft or loss of the mobile telephone. Hence, the security of the mobile telephone is improved.

Access to the SIM card is permitted and the functions of the mobile telephone are used only after the user is authenticated as the authorized user in the biometric authentication. Accordingly, it is possible to prevent falsification of the SIM card or the mobile telephone, thereby improving the security of the mobile telephone.

The PIN stored in the mobile telephone is encrypted on the basis of the biometric authentication information about the user. In addition, since the decryption key used in the decryption is generated on the basis of the biometric authentication information each time the user authentication is performed, the decryption key is not stored in the mobile telephone. Hence, the encrypted PIN cannot not be decrypted even if a third person has stolen a glance at the encrypted PIN. Furthermore, the decryption key used in the decryption of the encrypted PIN is deleted after the decryption of the PIN is terminated, thus improving the security of the mobile telephone.

Greater Convenience and Simplicity

Since the user authentication with the PIN is performed on the basis of the biometric authentication information, it is not necessary for the user to store the PIN and, therefore, it is possible to prevent an inconvenience that the mobile telephone is unusable because the user has forgotten the PIN.

The encrypted PIN is decrypted on the basis of the biometric authentication information about the user, so that it is not necessary to provide a special decryption key for the decryption of the encrypted PIN. As a result, a mobile telephone adopting the simple authentication system and having greater convenience can be realized.

Inexpensiveness

Since the biometric authentication function and the support of the SIM card can be achieved only with software including the PIN verification program without special hardware, an inexpensive mobile telephone can be realized.

Modifications

Although the present invention is applied to the mobile telephone in the above description, the present invention is applicable to other terminal devices including a PHS, a PDA, a laptop personal computer, and a desktop personal computer to achieve advantages similar to the ones described above.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile terminal device comprising:
   biometric information detecting means for detecting biometric information;
   encryption-key generating means for generating an encryption key on the basis of the biometric information detected by the biometric information detecting means, in personal-identification-number registration;
   encrypting means for encrypting a predetermined personal identification number with the encryption-key generated by the encryption-key generating means to generate a biometric encrypted personal-identification-number, in the personal-identification-number registration;
   encrypted personal-identification-number storing means for storing the biometric encrypted personal identification number generated by the encrypting means, in the personal-identification-number registration;
   decryption key generating means for generating a decryption key on the basis of the biometric information detected by the biometric information detecting means, in personal-identification-number verification;
   decrypting means for decrypting the biometric encrypted personal-identification-number stored in the encrypted personal-identification-number storing means with the decryption key generated by the decryption-key generating means to reproduce the personal identification number, in the personal-identification-number verification;
   personal-identification-number verifying means for comparing the personal identification number reproduced by the decrypting means with a personal identification number stored in advance in a personal-identification-number storing means to perform the personal-identification-number verification for enabling a predetermined function; and
   personal-identification-number determining means for determining, on the basis of biometric information detected by the biometric information detecting means, the reproduction of the personal identification number, in the personal-identification-number verification,
   wherein the personal-identification-number verifying means has an automatic authentication mode in which the personal identification number decrypted by the decrypting means is used to perform the personal-identification-number verification and a manual authentication mode in which a personal identification number directly input by a user with operating means is used to perform the personal-identification-number verification, and
   wherein the personal-identification-number verifying means performs the personal-identification-number verification in either the automatic authentication mode or the manual authentication mode, which mode is selected in advance by the user.

2. The mobile terminal device according to claim 1, further comprising:
   biometric information storing means for storing the biometric information detected by the biometric information detecting means, in the personal-identification-number registration; and
   comparing means for comparing the biometric information detected by the biometric information detecting means with the biometric information stored in the biometric information storing means in the personal-identification-number registration, in the personal-identification-number verification,
   wherein the decryption-key generating means generates the decryption key on the basis of the biometric information detected by the biometric information detecting means, if the comparison by the comparing means results in coincidence between the biometric information detected by the biometric information detecting means and the biometric information stored in the biometric information storing means.

3. The mobile terminal device according to claim 1 or 2, further comprising information deleting means for deleting the decryption key when the decryption by the decrypting means is terminated.

4. A personal identification number verification computer program product comprising a non-transitory computer readable medium including program code stored thereon, said program code being executable to perform operations comprising:
   generating, by encryption-key generating means, an encryption key on the basis of biometric information detected by a biometric information detecting means, in personal-identification-number registration;

encrypting, by encrypting means, a predetermined personal identification number with the generated encryption key to generate a biometric encrypted personal identification number and storing the biometric encrypted personal identification number in encrypted personal-identification-number storing means, in the personal-identification-number registration;

generating, by decryption-key generating means, a decryption key on the basis of the biometric information detected by the biometric information detecting means, in personal-identification-number verification;

decrypting, by decrypting means the biometric encrypted personal identification number stored in the encrypted personal-identification-number storing means with the generated decryption-key to reproduce the personal identification number, in the personal-identification-number verification;

comparing, by a personal-identification-number verifying means, the personal identification number reproduced by the generated decryption key with a personal identification number stored in a personal-identification-number storing means in the personal-identification-number registration to perform the personal-identification-number verification for enabling a predetermined function, in the personal-identification-number verification; and determining, by the personal-identification-number determining means, on the basis of biometric information detected by the biometric information detecting means, the reproduction of the personal identification number, in the personal-identification-number verification, wherein the personal-identification-number verifying means has an automatic authentication mode in which the personal identification number decrypted by the decrypting means is used to perform the personal-identification-number verification and a manual authentication mode in which a personal identification number directly input by a user with operating means is used to perform the personal-identification-number verification, and wherein the personal-identification-number verifying means performs the personal-identification-number verification in either the automatic authentication mode or the manual authentication mode, which mode is selected in advance by the user.

5. The personal identification number verification computer program product according to claim 4, wherein the operations further comprise:

comparing, by comparing means, the biometric information detected by the biometric information detecting means with the biometric information stored in biometric information storing means in the personal-identification-number registration, in the personal-identification-number verification, wherein, in the step of generating the decryption key, the decryption-key generating means generates the decryption key on the basis of the biometric information detected by the biometric information detecting means, if the comparison by the comparing means results in coincidence between the biometric information detected by the biometric information detecting means and the biometric information stored in the biometric information storing means.

6. A method of verifying a personal identification number comprising the steps of:

generating, by encryption-key generating means, an encryption key on the basis of biometric information detected by biometric information detecting means, in personal-identification-number registration;

encrypting, by encrypting means, a predetermined personal identification number with the generated encryption key to generate a biometric encrypted personal identification number and storing the biometric encrypted personal identification number in encrypted personal-identification-number storing means, in the personal-identification-number registration;

generating, by decryption-key generating means, a decryption key on the basis of the biometric information detected by the biometric information detecting means, in personal-identification-number verification;

decrypting, by decrypting means, the biometric encrypted personal identification number stored in the encrypted personal-identification-number storing means with the generated decryption key to reproduce the personal identification number, in the personal-identification-number verification; and comparing, by personal-identification-number verifying means, the personal identification number reproduced by the decrypting means with a personal identification number stored in a personal-identification-number storing means in the personal-identification-number registration to perform the personal-identification-number verification for enabling a predetermined function, in the personal-identification-number verification; and determining, by the personal-identification-number determining means, on the basis of biometric information detected by the biometric information detecting means, the reproduction of the personal identification number, in the personal-identification-number verification, wherein the personal-identification-number verifying means has an automatic authentication mode in which the personal identification number decrypted by the decrypting means is used to perform the personal-identification-number verification and a manual authentication mode in which a personal identification number directly input by a user with operating means is used to perform the personal-identification-number verification, and wherein the personal-identification-number verifying means performs the personal-identification-number verification in either the automatic authentication mode or the manual authentication mode, which mode is selected in advance by the user.

7. The method of verifying a personal identification number according to claim 6, further comprising the step of:

comparing, by comparing means, the biometric information detected by the biometric information detecting means with the biometric information stored in biometric information storing means in the personal-identification-number registration, in the personal-identification-number verification, wherein, in the step of generating the decryption key, the decryption-key generating means generates the decryption key on the basis of the biometric information detected by the biometric information detecting means, if the comparison by the comparing means results in coincidence between the biometric information detected by the biometric information detecting means and the biometric information stored in the biometric information storing means.

8. A mobile terminal device comprising:

a biometric information detector detecting biometric information;

an encryption key generator generating an encryption key on the basis of the biometric information detected by the biometric information detector, in personal-identification-number registration;

an encrypter encrypting a predetermined personal identification number with the encryption key generated by the encryption-key generator to generate a biometric encrypted personal identification number, in the personal-identification-number registration;

an encrypted personal-identification-number storer storing the biometric encrypted personal identification number generated by the encrypter, in the personal-identification-number registration;

a decryption-key generator generating a decryption key on the basis of the biometric information detected by the biometric information detector, in personal-identification-number verification;

a decryptor decrypting the biometric encrypted personal identification number stored in the encrypted personal-identification-number storer with the decryption key generated by the decryption-key generator to reproduce the personal identification number, in the personal-identification-number verification;

a personal-identification-number verifier comparing the personal identification number reproduced by the decryptor with a personal identification number stored in advance in a encrypted personal-identification-number storer to perform the personal-identification-number verification for enabling a predetermined function; and a personal-identification-number determiner for determining, on the basis of biometric information detected by the biometric information detecting means, the reproduction of the personal identification number, in the personal-identification-number verification, wherein the personal-identification-number verifier means has an automatic authentication mode in which the personal identification number decrypted by the decryptor is used to perform the personal-identification-number verification and a manual authentication mode in which a personal identification number directly input by a user with operating means is used to perform the personal-identification-number verification, and wherein the personal-identification-number verifier means performs the personal-identification-number verification in either the automatic authentication mode or the manual authentication mode, which mode is selected in advance by the user.

* * * * *